United States Patent Office 3,078,864
Patented Feb. 26, 1963

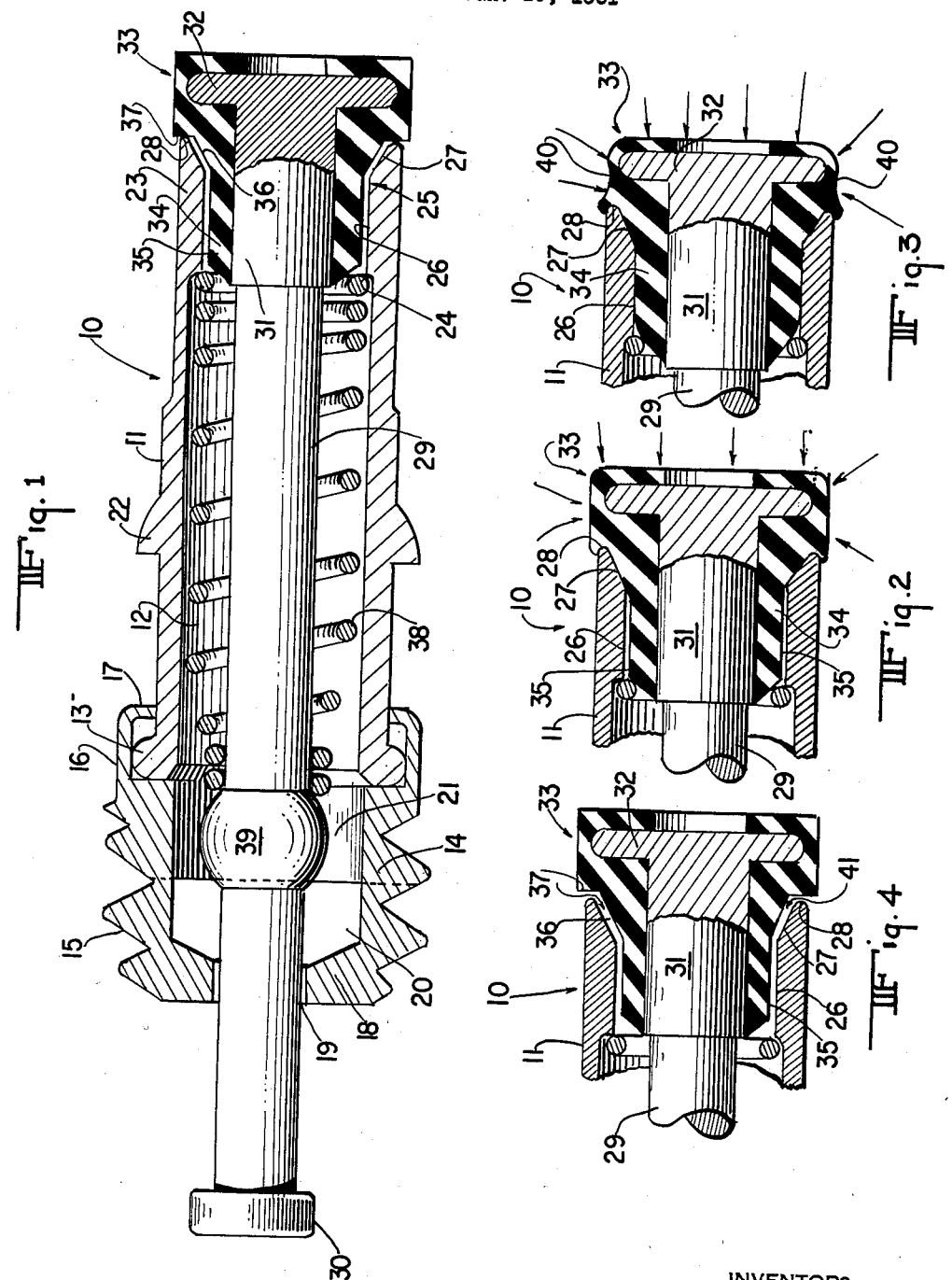

3,078,864
CORE FOR PNEUMATIC VALVE
Paul F. Schmid, Oradell, N.J., and John E. Muller, Monroe, N.Y., assignors to Acme Air Appliance Co., Inc., Hackensack, N.J., a corporation of New York
Filed Jan. 19, 1961, Ser. No. 83,773
8 Claims. (Cl. 137—223)

This invention relates generally to pneumatic valves, and more particularly is directed to improvements in the cores or valve insides thereof.

It is an object of the invention to provide a core for pneumatic valves which ensures an effective sealing action against relatively low and high pressures, and in situations where the valve is likely to be subjected to a wide range of temperatures, for example, as in the tires of busses or trucks, or in the pneumatic struts of aircraft.

More specifically, it is an object of the invention to provide a valve core comprising a barrel having a seat formed at one end thereof, and a valve pin carrying an elastomeric valve member which is engageable with the seat in the closed condition of the valve core, and wherein the seat and valve member are designed to provide a relatively small area of contact therebetween when a low air pressure acts against the valve member, with the area of sealing contact between the seat and valve member progressively increasing in response to increases in the air pressure, thereby to ensure an effective sealing action under all pressure conditions.

A further object is to provide a valve core having the foregoing characteristics, and which is relatively simple in construction and assembly so as to achieve a relatively low production cost.

In accordance with an aspect of this invention, a valve core or insides comprises a barrel which may be connected, at one end, to the usual threaded plug adapted to be screwed into the valve stem for locating the barrel within the latter, a valve seat adjacent the other end of the barrel including an inwardly facing cylindrical part, and a tapered part increasing in diameter from the cylindrical part to the adjacent end edge of the barrel, a valve pin extending axially in the barrel and having an end portion projecting out of the other end of the barrel and terminating in an enlarged head, spring means urging the valve pin axially relative to the barrel in the direction towards the plug, and a molded elastomeric valve member embracing the enlarged head of the valve pin and extending along the adjacent end portion of the latter, said valve member having a surface that includes a tapered portion extending parallel to the tapered portion of the seat between a radially directed annular shoulder, at its large diameter end, and a cylindrical surface portion normally having a smaller diameter than that of the inwardly facing cylindrical portion of the valve seat. The valve seat and elastomeric valve member are dimensionally related to each other so that, when the spring means acting on the valve pin urges the radially directed annular shoulder of the valve member against the end edge of the barrel, the tapered and cylindrical surface portions of the valve member are spaced from the tapered and cylindrical parts of the seat, thereby providing a relatively small area of sealing contact between the valve member and barrel edge sufficient to prevent leaking therebetween of air under relatively low pressure, while permitting correct alignment of the valve member and pin with respect to the barrel. Under the influence of a moderately larger pressure acting on the valve member, the end edge of the barrel indents the annular shoulder of the elastomeric valve member and the resultant axial movement of the valve pin relative to the barrel brings about sealing contact between the tapered surface portion of the valve member and the tapered part of the valve seat, thereby increasing the area of sealing contact sufficiently to resist such moderately increased pressure. A further increase in the pressure acting on the valve member produces flow of the elastomeric material thereof, and thereby causes the cylindrical surface portion of the valve member to bulge into engagement with the cylindrical part of the valve seat, for further increasing the area of sealing contact so as to provide an effective seal against the leakage of air under high pressures between the valve member an seat.

The above, and other objects, features and advantages of the invention, will be apparent in the following detailed description of an illustrative embodiment thereof which is to be read in connection with the accompanying drawing forming a part hereof, and wherein:

FIG. 1 is a longitudinal sectional view of a valve core or insides embodying the present invention, and which is shown in its closed condition when subjected to a low air pressure;

FIG. 2 is a fragmentary sectional view similar to a portion of FIG. 1, but showing the condition of the valve core when subjected to a moderately increased or higher pressure;

FIG. 3 is a view similar to that of FIG. 2 but showing the condition of the valve core when subjected to a still higher pressure; and FIG. 4 is a view similar to that of FIGS. 2 and 3, but showing the valve core in its open condition.

Referring to the drawing in detail, and initially to FIG. 1 thereof, it will be seen that a valve core or insides embodying the present invention, and there generally identified by the reference numeral 10, includes a barrel or tube 11 having an axial bore 12 extending therethrough. One end of barrel 11 has an external rim or lip 13 extending therearound, and a plug 14, which is externally threaded, as at 15, is formed with an axially directed, annular flange 16 extending over rim 13 and struck inwardly at its free edge, as at 17, so as to connect plug 14 and barrel 11. Plug 14 has the usual chord-like cutaway portions (not shown) at its end remote from barrel 11 to define a diametrically extending bridge 18 therebetween, and such bridge has a central opening 19 and lateral openings 20 at its opposite sides communicating with the interior 21 of the plug.

The barrel 11 further has an external annular rib 22 thereon to retain a sealing ring (not shown) on the outer surface of barrel 11 between plug 14 and rim 22 which sealing ring is intended for sealing engagement with the internal surface of the usual valve stem into which plug 14 is screwed for the purpose of locating barrel 11 within the valve stem.

The end portion 23 of barrel 11 remote from plug 14 has a wall of increased thickness defining a reduced diameter end portion of bore 12. An internal annular shoulder 24 facing toward plug 14 is defined within barrel 11 between the reduced diameter end portion of bore 12 and the remainder of the latter.

In accordance with the present invention, the end portion 23 of barrel 11 forms a valve seat generally identified by the reference numeral 25 and having an inwardly facing cylindrical part 26 and a tapered part 27 increasing in diameter from cylindrical part 26 to the adjacent end edge 28 of the barrel.

An elongated valve pin 29 of substantially smaller diameter than bore 12 extends axially through barrel 11 and plug 14 and is loosely guided in the central opening 19 of bridge 18. The end portion of pin 29 extending through opening 19 terminates in a head 30 larger than opening 19 to limit the axial displacement of the valve pin in the direction toward the valve seat 25. Further, pin 29 has an end portion 31 extending out of barrel 11 beyond end edge 28 and terminating in an enlarged head 32 preferably having an outer diameter which is approximately equal to the outer diameter of barrel 11 at the adjacent end of the latter.

In accordance with the present invention, a molded valve member 33 of elastomeric material, such as, synthetic rubber which is preferably of the type commercially available from E. I. du Pont de Nemours and Co. under the tradename "Hypalon, that is, chlorosulfonated polyethylene, embraces the head 32 of valve pin 29 and includes a portion 34 extending along end portion 31 of the valve pin. The portion 34 of valve member 33 has a cylindrical surface portion 35 with a normal diameter that is smaller than the diameter of cylindrical part 26 of valve seat 25. A tapered surface portion 36 extends from cylindrical surface portion 35 parallel to the tapered part 27 of the valve seat and joins, at its large diameter end, a radially outward directed annular shoulder 37 disposed at the side of head 32 facing toward edge 28.

As is apparent in FIG. 1, the tapered surface portion 36 has a diameter, at its small end, which is equal to the normal diameter of cylindrical surface portion 35, that is, smaller than the smallest diameter of tapered part 27 of the valve seat, while the large end of tapered surface portion 36 has a normal diameter which is also smaller than the maximum diameter of tapered part 27 of the valve seat. Thus, when pin 29 is urged lightly towards the left, as viewed in FIG. 1, end edge 28 of barrel 11 is engaged by radial shoulder 37 of valve member 33 while surface portions 35 and 36 remain spaced from seat parts 26 and 27 to provide sealing contact between valve member 33 and seat 25 over a relatively small area.

The valve core or insides 10 embodying the present invention is completed by a helical spring 38 which extends around valve pin 29 within barrel 11 and which abuts, at its opposite ends, against shoulder 24 of the barrel and against a knob enlargement 39 formed on the portion of pin 29 disposed within the interior 21 of plug 14. Thus, spring 38 yieldably urges valve pin 29 relative to barrel 11 in the axial direction for engaging valve member 33 with valve seat 25 in the manner indicated in FIG. 1.

Since initial engagement of valve member 33 with valve seat 25 is effected over the small contact area of edge 28 with shoulder 37, as previously described herein, and since pin 29 has a relatively large radial play within barrel 11, the elastomeric valve member 33 can automatically correctly align itself with respect to valve seat 25 so as to obtain uniform contact between edge 28 and shoulder 37 and thereby provide an improved seal against the entry into the bore 12 of air under even a relatively low pressure.

Referring to FIG. 2, it will be seen that, when a relatively higher pressure is exerted on valve member 33, as indicated by the arrows on FIG. 2, the effect of such increased pressure is to urge the valve member 33 and pin 29 axially toward the left, as viewed in the drawing, so that edge 28 of barrel 11 is embedded into annular shoulder 37 of valve member 33 and tapered surface portion 36 of the valve member comes into engagement with tapered part 27 of the valve seat, thereby to increase the area of sealing contact and correspondingly increase the resistance to leakage of air under the increased pressure between the valve member 33 and the valve seat.

Referring to FIG. 3, it will be seen that, upon a still further increase in the pressure of the air acting on valve member 33, as represented by the arrows on FIG. 3, end portion 31 of pin 29 is further displaced toward the left, as viewed in the drawing, with respect to the barrel 11, thereby to decrease the distance between edge 28 and enlarged head 32, while the high pressure acting radially inward against the exposed periphery of elastomeric valve member 33 tends to force the periphery inwardly between edge 28 and head 32, as at 40. Such decrease in the axial distance between edge 28 and head 32 and the radially inward depression of the periphery of the valve member have a combined action causing the elastomeric material of valve member 33 to flow into the space between end portion 31 of pin 29 and cylindrical part 26 of the valve seat, thereby increasing the radial thickness of portion 34 of the valve member and urging the surface portion 35 into sealing engagement with cylindrical part 26 of the seat.

Thus, under the further increased pressure, valve member 33 effects contact with valve seat 25 over the entire area of the latter, that is, over the cylindrical part 26, the tapered part 27 and the end edge 28, and this increased area of sealing contact positively prevents any leakage of air past the valve seat even when the air is under extremely high pressures.

Elastomeric valve member 33 may be molded directly on head 32 and adjacent end portion 31 of valve pin 29, or it may be molded apart from the valve pin and, by reason of its resilience, thereafter assembled or installed on end portion 31 and head 32 with the latter serving to secure the valve member in its operative position on the valve pin. In either case, the pressure of air acting on valve member 33 tends to urge the latter into more intimate contact with head 32 and adjacent end portion 31, so that, as the air pressure increases, the pressure of the contact of the valve member with the embraced head 32 and end portion 31 correspondingly increases so as to avoid any possibility of leakage of the air between the valve member and valve pin.

When it is desired to release the air under pressure, valve pin 29 is displaced axially relative to barrel 11 by pressing on the head 30 of the valve pin, that is, valve pin 29 is moved toward the right, as viewed in the drawing, to the position illustrated in FIG. 4, where the annular shoulder 37 of valve member 33 is spaced axially from edge 28 of the valve seat and defines an annular passage 41 between valve member 33 and valve seat 25 which opens radially outward between edge 28 and shoulder 37. It will be apparent that the annular passage 41 is a generally uniform width throughout its length so that the air under pressure entering such passage can stream or flow at high speed therethrough without encountering any sharp reductions in area that would impede the high speed flow, whereby a rapid reduction of pressure is possible when the valve core is in its opened condition.

Since the chlorosulfonated polyethylene or Hypalon of which valve member 33 is preferably molded is oil and chemical resistant, unattacked by ozone, and resistant to extremes of temperature and weather, it is apparent that the valve core 10 embodying the present invention is ideally suited for use in situations where the valve core must provide effective sealing against either high or low pressures under extremes of high and low temperatures, or where the valve member may come in contact with chemicals or oil.

Although an illustrative embodiment of the invention has been described in detail herein with reference to the accompanying drawing, it is to be understood that the invention is not limited to that precise embodiment, and that various changes and modifications may be effected therein without departing from the scope or spirit of the invention, except as defined in the appended claims.

What is claimed is:

1. In a penumatic valve core, the combination of a barrel having a valve seat at one end including an inwardly facing cylindrical part and a tapered part extending from the latter to the edge of the barrel at said one end, a valve pin movable axially in said barrel and having an end portion projecting out of said one end of the barrel, and an elastomeric valve member on said end portion of the valve pin and having an annular, radially directed shoulder facing said edge of the barrel, a cylindrical surface portion and a tapered surface portion between the latter and said shoulder, said cylindrical and tapered surface portions being dimensioned so as to be normally spaced radially from said cylindrical and tapered parts, respectively, upon initial contact of said shoulder with said edge, said valve member being formed of elastomeric material that is flowable under a pneumatic pressure applied thereto, whereby increased air pressures urging said valve member against said edge cause the latter to indent said shoulder and bring said tapered part and surface portion into mutual engagement and further cause said cylindrical surface portion to bulge outwardly into engagement with said cylindrical part of the seat for increasing the area of sealing contact of said valve member with said seat available to resist leakage therebetween of air under said increased pressures.

2. In a pneumatic valve core, the combination of a barrel having a valve seat at one end including an inwardly facing cylindrical part and a tapered part extending from the latter to the edge of the barrel at said one end, a valve pin movable axially in said barrel and having an end portion projecting out of said one end of the barrel, and a chlorosulfonated polyethylene valve member on said end portion of the valve pin and having an annular, radially directed shoulder facing said edge of the barrel, a cylindrical surface portion and a tapered surface portion between the latter and said shoulder, said cylindrical and tapered surface portions being dimensioned so as to be normally spaced radially from said cylindrical and tapered parts, respectively, upon initial contact of said shoulder with said edge, said valve member being a molded body of a chlorosulfonated polyethylene that is flowable under a pneumatic pressure applied thereto, whereby increased air pressures urging said valve member against said edge cause the latter to indent said shoulder and bring said tapered part and surface portion into mutual engagement and further cause said cylindrical surface portion to bulge outwardly into engagement with said cylindrical part of the seat for increasing the area of sealing contact of said valve member with said seat available to resist leakage therebetween of air under said increased pressures.

3. In a pneumatic valve core, the combination of a barrel having a valve seat at one end including an inwardly facing cylindrical part and a tapered part extending from the latter to the edge of the barrel at said one end, a valve pin movable axially in said barrel and having an end portion projecting out of said one end of the barrel, an elastomeric valve member on said end portion of the valve pin having an annular, radially directed shoulder facing said edge of the barrel, a cylindrical surface portion and a tapered surface portion between the latter and said shoulder, said cylindrical and tapered surface portions being dimensioned so as to be normally spaced radially from said cylindrical and tapered parts, respectively, of the seat upon initial contact of said shoulder with said edge, and spring means urging said pin axially in the direction for contacting said shoulder with said edge of the barrel, said valve member being formed of elastomeric material that is flowable under a pneumatic pressure applied thereto, whereby increased pressures urging said valve member in said direction cause said edge to indent said shoulder and bring said tapered part and tapered surface portion into mutual engagement and further cause said cylindrical surface portion to bulge outwardly into engagement with said cylindrical part of the seat for increasing the area of sealing contact of said valve member with said seat available to resist leakage therebetween of such increased pressures.

4. In a pneumatic valve core, the combination of a barrel having a valve seat at one end including an inwardly facing cylindrical part and a tapered part extending from the latter to the edge of the barrel at said one end, a valve pin movable axially in said barrel and including an end portion projecting out of said one end of the barrel and terminating in an enlarged head, an elastomeric valve member embracing said head and extending along said end portion of the valve pin, said valve member having an annular, radially directed shoulder at the side of said head facing toward said edge of the barrel and an outwardly facing cylindrical surface portion extending along said end portion of the pin and joining said shoulder by way of a tapered surface portion, said cylindrical and tapered surface portions of the valve member being dimensioned so as to be normally spaced from said cylindrical and tapered parts, respectively, of the valve seat upon initial contact of said shoulder with said edge, and spring means urging said pin axially in the direction for contacting said shoulder with said edge so that leakage of air under low pressure is resisted at the relatively small area of contact of said edge and shoulder, said valve member being formed of elastomeric material that is flowable under a pneumatic pressure applied thereto, whereby increased pressures urging said valve member in said direction cause said edge to indent said shoulder and bring said tapered part and tapered surface portion into mutual engagement and further cause said cylindrical surface portion to bulge outwardly into engagement with said cylindrical part of the seat for increasing the area of sealing contact of said valve member with said seat available to resist leakage therebetween of such increased pressures.

5. In a pnematic valve core, the combination of a barrel having a valve seat at one end including an inwardly facing cylindrical part and a tapered part extending from the latter to the edge of the barrel at said one end, a valve pin movable axially in said barrel and including an end portion projecting out of said one end of the barrel and terminating in an enlarged head, a chlorosulfonated polyethylene valve member embracing said head and extending along said end portion of the valve pin, said valve member having an annular, radially directed shoulder at the side of said head facing toward said edge of the barrel and an outwardly facing cylindrical surface portion extending along said end portion of the pin and joining said shoulder by way of a tapered surface portion, said cylindrical and tapered surface portions of the valve member being dimensioned so as to be normally spaced from said cylindrical and tapered parts, respectively, of the valve seat upon initial contact of said shoulder with said edge, and spring means urging said pin axially in the direction for contacting said shoulder with said edge so that leakage of air under low pressure is resisted at the relatively small area of contact of said edge and shoulder, said valve member being a molded body of a chlorosulfonated polyethylene that is flowable under a pneumatic pressure applied thereto, whereby increased pressures urging said valve member in said direction cause said edge to indent said shoulder and bring said tapered part and tapered surface portion into mutual engagement and further cause said cylindrical surface portion to bulge outwardly into engagement with said cylindrical part of the seat for increasing the area of sealing contact of said valve member with said seat available to resist leakage therebetween of such increased pressures.

6. In a pneumatic valve core, the combination of a barrel having an axial bore extending therethrough and having a reduced diameter end portion terminating in a tapered seat increasing in diameter in the direction toward the adjacent end edge of said barrel, a valve pin movable axially in said bore with substantial radial clearance therebetween, said pin having an end portion projecting through said reduced diameter end portion of the bore and terminating in an enlarged head, and an elastomeric valve member embracing said head and end portion of the valve pin, said valve member having an annular, radially directed shoulder at the side of said head forcing toward said end edge of the barrel and adapted to abut against said end edge and an outwardly facing cylindrical surface portion normally of smaller diameter than said end portion of the bore extending along said end portion of the pin and being connected to said shoulder by a tapered surface portion extending parallel to said tapered seat and being normally spaced from the latter by engagement of said shoulder with said end edge of the barrel, said valve member being formed of elastomeric material that is flowable under a pneumatic pressure applied thereto, so that high air pressures acting on said elastomeric valve member tend to cause said end edge to indent said shoulder for bringing said tapered surface portion into engagement with said tapered seat, and further tend to compress said valve member radially inward between said end edge and head for causing said cylindrical surface portion to bulge outwardly into contact with said reduced diameter end portion of the bore, thereby increasing the area of sealing contact available between said valve member and barrel to resist said high air pressures.

7. In a pneumatic valve core, the combination as in claim 6; further comprising spring means between said barrel and valve pin urging the latter axially in the direction for initially engaging said shoulder of the valve member with said end edge of the barrel.

8. In a pneumatic valve core, the combination as in claim 6; wherein said valve member is of chlorosulfonated polyethylene so as to have high resistance to extreme temperatures.

References Cited in the file of this patent
FOREIGN PATENTS 531,665    Canada _____ Oct. 16, 1956

OTHER REFERENCES

Du Pont Information Bulletin, "Hypalon," No. x–32a, Table II, pages 18, 19, FIGURE 15, page 33. (Copy in Div. 50.)

UNITED STATES PATENT OFFICE
CERTIFICATE OF CORRECTION

Patent No. 3,078,864            February 26, 1963

Paul F. Schmid et al.

It is hereby certified that error appears in the above numbered patent requiring correction and that the said Letters Patent should read as corrected below.

Column 2, line 12, for "an" read -- and --; column 3, line 39, after "knob" insert -- or --; column 6, line 69, for "forcing" read -- facing --.

Signed and sealed this 1st day of October 1963.

(SEAL)
Attest:

ERNEST W. SWIDER                          DAVID L. LADD
Attesting Officer                       Commissioner of Patents